US009184658B2

(12) United States Patent
Ueno et al.

(10) Patent No.: US 9,184,658 B2
(45) Date of Patent: Nov. 10, 2015

(54) DC-DC CONVERTING CIRCUIT

(71) Applicant: KABUSHIKI KAISHA TOSHIBA, Minato-ku, Tokyo (JP)

(72) Inventors: Takeshi Ueno, Kawasaki (JP); Tetsuro Itakura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 227 days.

(21) Appl. No.: 13/909,545

(22) Filed: Jun. 4, 2013

(65) Prior Publication Data

US 2013/0328536 A1    Dec. 12, 2013

(30) Foreign Application Priority Data

Jun. 11, 2012 (JP) .................................. 2012-131757

(51) Int. Cl.
| G05F 1/10 | (2006.01) |
|---|---|
| H02M 3/158 | (2006.01) |
| H02M 3/156 | (2006.01) |

(52) U.S. Cl.
CPC .......... *H02M 3/1582* (2013.01); *H02M 3/1563* (2013.01); *H02M 3/1588* (2013.01); *Y02B 70/1466* (2013.01)

(58) Field of Classification Search
CPC .................................... G05F 1/00; G05F 1/56
USPC .................. 323/222–225, 268, 271, 282–285
See application file for complete search history.

(56) References Cited

U.S. PATENT DOCUMENTS

| 6,548,991 | B1* | 4/2003 | Maksimovic et al. | ........ 323/224 |
|---|---|---|---|---|
| 7,816,896 | B2* | 10/2010 | Lipcsei et al. | ................ 323/271 |
| 7,843,186 | B2* | 11/2010 | Nishida | ......................... 323/284 |
| 2012/0001603 | A1* | 1/2012 | Ouyang et al. | ................ 323/271 |
| 2012/0176106 | A1* | 7/2012 | Takagishi | ....................... 323/271 |
| 2012/0212195 | A1* | 8/2012 | Kushida et al. | ............... 323/271 |

OTHER PUBLICATIONS

Takashi Nabeshima et al.: "Analysis and Design Considerations of a Buck Converter with a Hysteretic PWM Controller": 2004 35$^{th}$ IEEE Power Electronics Specialists Conference: pp. 1711-1716 (in English).

"4MHz, 500mA, Synchronous Step-Down DC-DC Converters in Thin SOT and TDFN": (http://datasheets.maxim-ic.com/en/ds/MAX850-MAX8562.pdf): pp. 1-12 (in English).

(Continued)

*Primary Examiner* — Matthew Nguyen

(74) *Attorney, Agent, or Firm* — Holtz, Holtz, Goodman & Chick PC

(57) ABSTRACT

A DC-DC converter converts an input voltage into an output voltage and includes an input terminal, an output terminal, a power stage, a switch driving circuit, a charge pump, and a capacitor. The power stage includes a high-side switch, a low-side switch and an inductor. The switch driving circuit generates a high-side switch driving signal and a low-side switch driving signal. The charge pump generates a first polarity current according to the high-side switch driving signal, and generates a second polarity current having an opposite polarity to the first polarity current according to the low-side switch driving signal. The capacitor generates a first voltage by integrating the first and second polarity currents generated by the charge pump. The switch driving circuit generates the high-side switch driving signal and the low-side switch driving signal according to a difference between the first voltage and a reference voltage.

9 Claims, 5 Drawing Sheets

(56) References Cited

OTHER PUBLICATIONS

Peter Hazucha et al.: "A 233-MHz 80%-87% Efficient Four Phase DC-DC Converter Utilizing Air-Core Inductors on Package": IEEE Journal of Solid State Circuits: vol. 40, No. 4: Apr. 2005: pp. 838-845 (in English).

Japanese Office Action dated Jul. 22, 2014 in counterpart Japanese Application No. 2012-131757.

* cited by examiner

DC-DC CONVERTING CIRCUIT

CROSS REFERENCE TO RELATED APPLICATIONS

This application is based upon and claims the benefit of priority from the prior Japanese Patent Application No. 2012-131757 filed on Jun. 11, 2012, the entire contents of which are incorporated herein by reference.

FIELD

Embodiments described herein relates to a DC-DC converting circuit.

BACKGROUND

A ripple-control DC-DC conversion is a method in which a voltage ripple at a power stage is inputted to a comparator and a comparator output signal is used as a switch driving signal, and the switching is a self-excited operation. Thus, since it is not require a clock supplied thereto from the outside and hence the operating speed is not limited by a clock frequency, the conversion has a feature of rapid response to load variation. Besides, the conversion has an advantage of reducing the circuit size because it does not require using a pulse width modulation (PWM) modulator or a compensator.

An example of a conventional ripple-control DC-DC converting circuit is described below. A high-side switch and a low-side switch, which complementarily operate, step down an input voltage applied to an input terminal to a voltage lower than the input voltage. The stepped-down voltage is smoothed by an inductor and a capacitor and is outputted from an output terminal.

When an output voltage is directly fed back, a loop operation is unstable due to a phase rotation of 180° by the inductor and the capacitor. In order to solve the problem, in the conventional ripple-control DC-DC converting circuit, a ripple voltage is generated by passing a difference voltage between the stepped-down voltage and the output voltage through a low-pass filter composed of a resistor Rf and another capacitor Cf. The ripple voltage is fed back and is compared with a reference voltage in a comparator. An output voltage of the comparator is used as a driving signal for the high-side switch, and a signal obtained by inverting a comparator output with an inverter is used as a driving signal for the low-side switch.

When the time constant Rf*Cf of the low-pass filter is set sufficiently large, the waveform of the ripple voltage is similar to the waveform of an inductor current, so that the phase rotation in the open loop amounts to 90°. As a result, the feedback loop operates stably.

As mentioned above, the conventional ripple-control DC-DC converter has an advantage that the stable operation can be achieved by a simple circuit but has a disadvantage that the time constant of the low-pass filter needs to be set large.

For example, in a ripple-control DC-DC converter that operates with a relatively high switching frequency of 4 MHz, an external resistor and a capacitor constituting the low-pass filter have large values of Rf=100 kΩ and Cf=150 pF. In order to apply the conventional technique to a DC-DC converter having a switching frequency lower than 4 MHz, elements having values larger than above are required, and it is very difficult to incorporate the low-pass filter into a DC-DC converter IC.

DETAILED DESCRIPTION

According to some embodiments, there is provided a DC-DC converter converting an input voltage into an output voltage different from the input voltage, including: an input terminal, an output terminal, a power stage, a switch driving circuit, a charge pump, and a capacitor.

The input terminal receives the input voltage.

The output terminal outputs the output voltage.

The power stage includes a high-side switch, a low-side switch and an inductor. The high-side switch includes a first end connected to the input terminal. The low-side switch includes a first end connected to a ground and a second end connected to a second end of the high-side switch. The inductor includes a first end connected to the second end of the high-side switch and a second end connected to the output terminal;

The switch driving circuit generates a high-side switch driving signal and a low-side switch driving signal that drive the high-side switch and the low-side switch.

The charge pump generates a current of a first polarity according to the high-side switch driving signal and generates a current of a second polarity having an opposite polarity to the first polarity according to the low-side switch driving signal.

The capacitor generates a first voltage by integrating the current of a first polarity and the current of a second polarity generated by the charge pump.

The switch driving circuit generates the high-side switch driving signal and the low-side switch driving signal according to a difference between the first voltage and a reference voltage.

Figure 1:
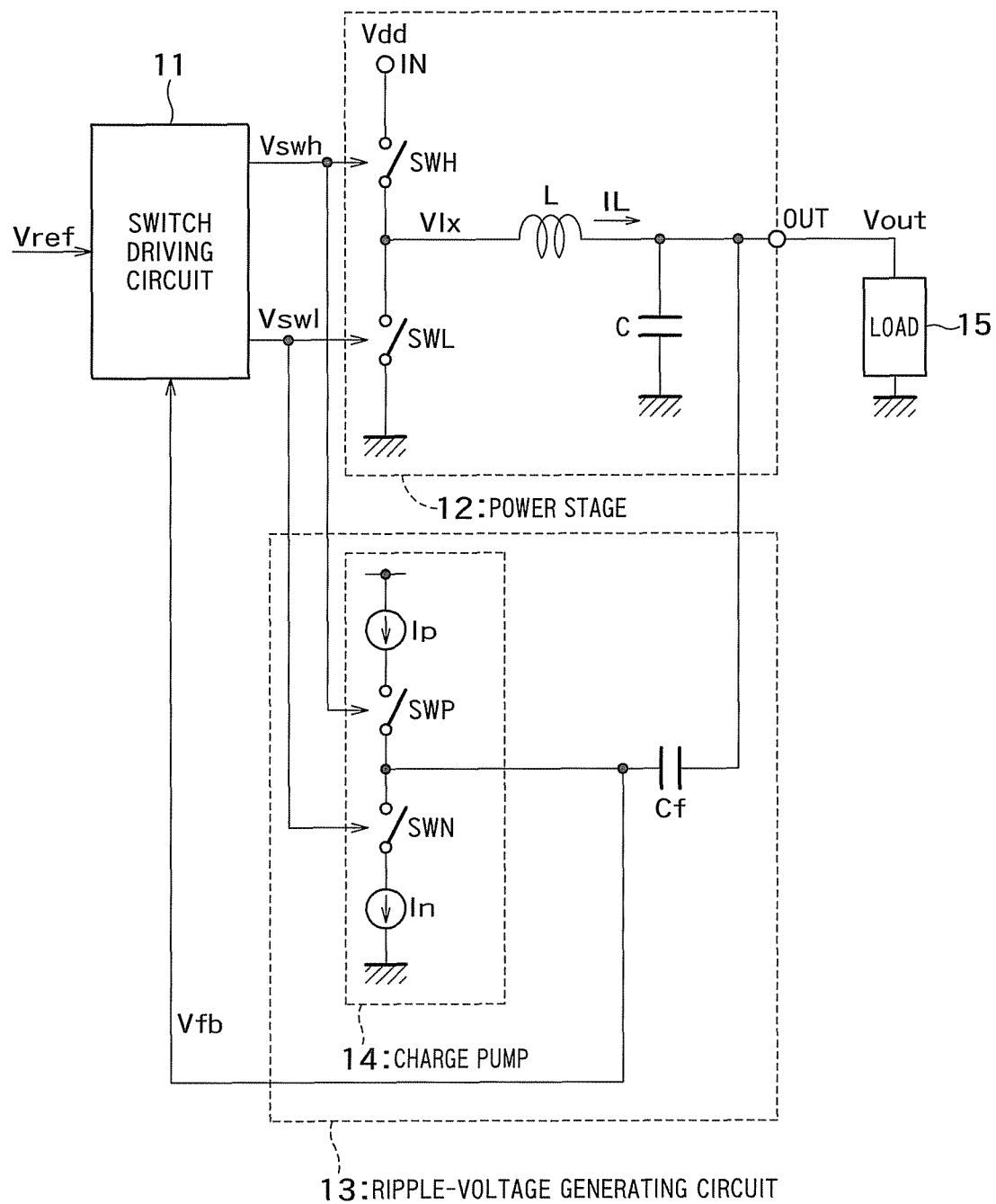
FIG. 1 is a circuit diagram showing a configuration of a ripple-control DC-DC converter in accordance with an embodiment.

FIG. 1 shows a ripple-control DC-DC converter in accordance with an embodiment of the present invention and a load to which an output voltage after DC-DC conversion by the ripple-control DC-DC converter is applied.

The ripple-control DC-DC converter in FIG. 1 includes a switch driving circuit 11, a power stage 12, and a ripple-voltage generating circuit 13.

The switch driving circuit 11 compares a reference voltage Vref with a ripple voltage (first voltage) Vfb fed back from the ripple-voltage generating circuit 13 and outputs a high-side switch driving signal Vswh and a low-side switch driving signal Vswl. The reference voltage Vref is equivalent to a target voltage of the voltage after DC-DC conversion by the converter.

The power stage 12 includes an input terminal IN, a high-side switch SWH, a low-side switch SWL, an inductor L, and a capacitor C. In the power stage 12, on/off of the high-side switch SWH and the low-side switch SWL is controlled according to the high-side switch driving signal Vswh and the low-side switch driving signal Vswl from the switch driving circuit 11. The high-side switch SWH turns on when the Vswh is a high level, and turns off when the Vswh is a low level. The low-side switch SWL turns on when the Vswl is a high level, and turns off when the Vswl is a low level. The high-side switch SWH and the low-side switch SWL complementarily operate; when one is in on state, the other is in off state. With the operation like this, the power stage 12 converts a voltage Vdd inputted to the input terminal IN into an output voltage Vout lower than the voltage Vdd. The output voltage Vout is outputted from an output terminal OUT and is applied to a load 15. A CPU, a memory, and a battery or the like can be used as the load 15. Although in the embodiment, an input voltage is converted into a voltage lower than the input voltage, the present invention can also be applicable when an input voltage is converted into an output voltage higher than the input voltage.

The ripple-voltage generating circuit 13 includes a charge pump 14 and a capacitor Cf.

The charge pump 14 includes constant current sources Ip and In, and switches SWP and SWN. A first end of the constant current source Ip is connected to the voltage Vdd and a second end is connected to a first end of the switch SWP. A first end of the constant current source In is connected to the ground and a second end is connected to a first end of the switch SWN. The second ends of the switches SWP and SWN are connected to each other, and the connection point is electrically connected to a first end of the capacitor Cf. A second end of the capacitor Cf is electrically connected to the output terminal OUT.

The switches SWP and SWN receive the high-side switch driving signal Vswh and the low-side switch driving signal Vswl from the switch driving circuit 11. Thus, the switch SWP operates in synchronized with the high-side switch SWH in the power stage 12, and the switch SWN operates in synchronized with the low-side switch SWL in the power stage.

In other words, a first switch driven according to the high-side switch driving signal Vswh operates in synchronized with the high-side switch SWH, and a second switch driven according to the low-side switch driving signal Vswl operates in synchronized with the low-side switch SWL.

When the switch SWH turns on, charges are supplied from the current source Ip to the capacitor Cf, and when the switch SWL turns on, the charges are extracted from the capacitor Cf by the current source In. A voltage (ripple voltage) at the first end of the capacitor Cf is inputted to the switch driving circuit 11 as the feedback voltage Vfb.

Thus, the charge pump 14 generates a current of a first polarity according to the high-side switch driving signal and generates a current of a second polarity having the opposite polarity of the first polarity according to the low-side switch driving signal. The capacitor Cf integrates the current generated by the charge pump 14 to generate the ripple voltage (first voltage). The generated ripple voltage is fed back to the switch driving circuit 11.

By operating the charge pump 14 in synchronized with the switches SWH and SWL in the power stage as described above, the waveform of the feedback voltage Vfb becomes similar to the waveform of an inductor current IL. In other words, the phase rotation in the open loop amounts to 90° or substantially 90°. Thus, a stable loop operation can be performed (oscillation due to a negative feedback does not occur) without using a resistor or a large capacitor, like a conventional technique.

For example, the current values of the current sources Ip and In and the capacitance value of the capacitor Cf for achieving the embodiment are several hundreds of nA and several tenth of pF, respectively, and therefore, the current sources and the capacitor can be easily installed in an IC.

The switch driving circuit 11 compares the feedback voltage Vfb with the reference voltage Vref and outputs the high-side switch driving signal Vswh and the low-side switch driving signal Vswl.

As described above, according to the embodiment, the feedback voltage to the switch driving circuit can be generated by the stable loop operation and with a reduced circuit area.

In the embodiment, although the second end of the capacitor Cf is connected to the output terminal Vout, the embodiment is not limited to the configuration in so far as the feedback voltage is generated using the output voltage. For example, the second end of the capacitor Cf may be connected to a fixed voltage, and the feedback voltage may be generated according to the voltage at the first end of the capacitor Cf and the output voltage Vout.

Besides, in the embodiment, although the high-side switch SWH and the switch SWP are synchronized with each other and the low-side switch SWL and the switch SWN are synchronized with each other, the high-side switch SWH and the switch SWN may be synchronized with each other and the low-side switch SWL and the switch SWP may be synchronized with each other. Also in this case, the waveform of the feedback voltage Vfb is similar to the waveform of the inductor current IL, so that the advantage of the embodiment can be obtained.

Figure 2:
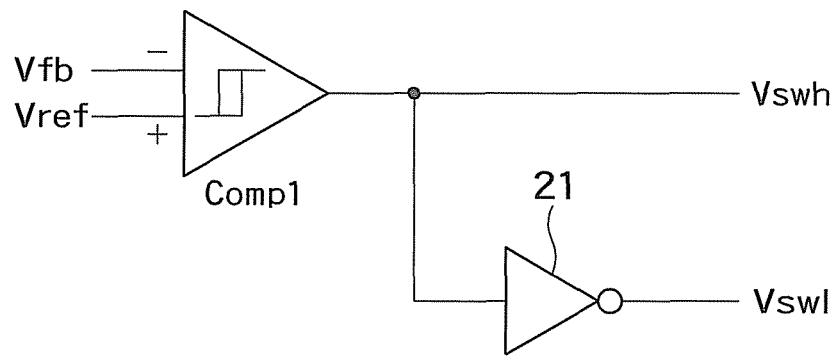
FIG. 2 is a circuit diagram in accordance with an embodiment of a switch driving circuit in FIG. 1.

FIG. 2 shows a specific configuration example of the switch driving circuit 11.

A hysteresis comparator Comp1 compares the feedback voltage Vfb with the reference voltage Vref and outputs a comparison result signal that is a comparator output as the high-side switch driving signal Vswh. An inverter 21 inverts the high-side switch driving signal Vswh and outputs the inverted signal as the low-side switch driving signal Vswl.

Since the ripple-voltage width of the feedback voltage Vfb is determined by the hysteresis width of the hysteresis comparator Comp1, the switching frequency can be adjusted by the hysteresis width.

In such a configuration in which the high-side switch SWH is synchronized with the switch SWN and the low-side switch SWL is synchronized with the switch SWP, the inputs of Vfb and Vref at the hysteresis comparator Comp1 may be exchanged for each other.

Figure 3:
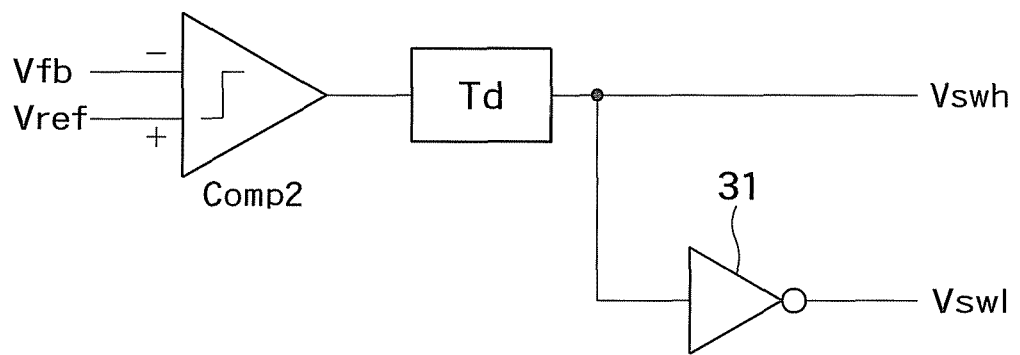
FIG. 3 is a circuit diagram in accordance with another embodiment of the switch driving circuit in FIG. 1.

FIG. 3 shows another example of the switch driving circuit.

The switch driving circuit is achieved by a comparator Comp2 having no hysteresis, instead of the hysteresis comparator shown in FIG. 2, and a delay element Td. In this case, the switching frequency can be adjusted by the delay time of the delay element Td. The comparator Comp2 outputs a high-level signal as a comparison result signal when Vfb is smaller than Vref, and outputs a low-level signal as the comparison result signal when Vfb is larger than Vref.

As in the configuration shown in FIG. 2, if the high-side switch SWH is synchronized with the switch SWN and the low-side switch SWL is synchronized with the switch SWP, the inputs of Vfb and Vref at the comparator Comp2 may be exchanged for each other.

Figure 4:
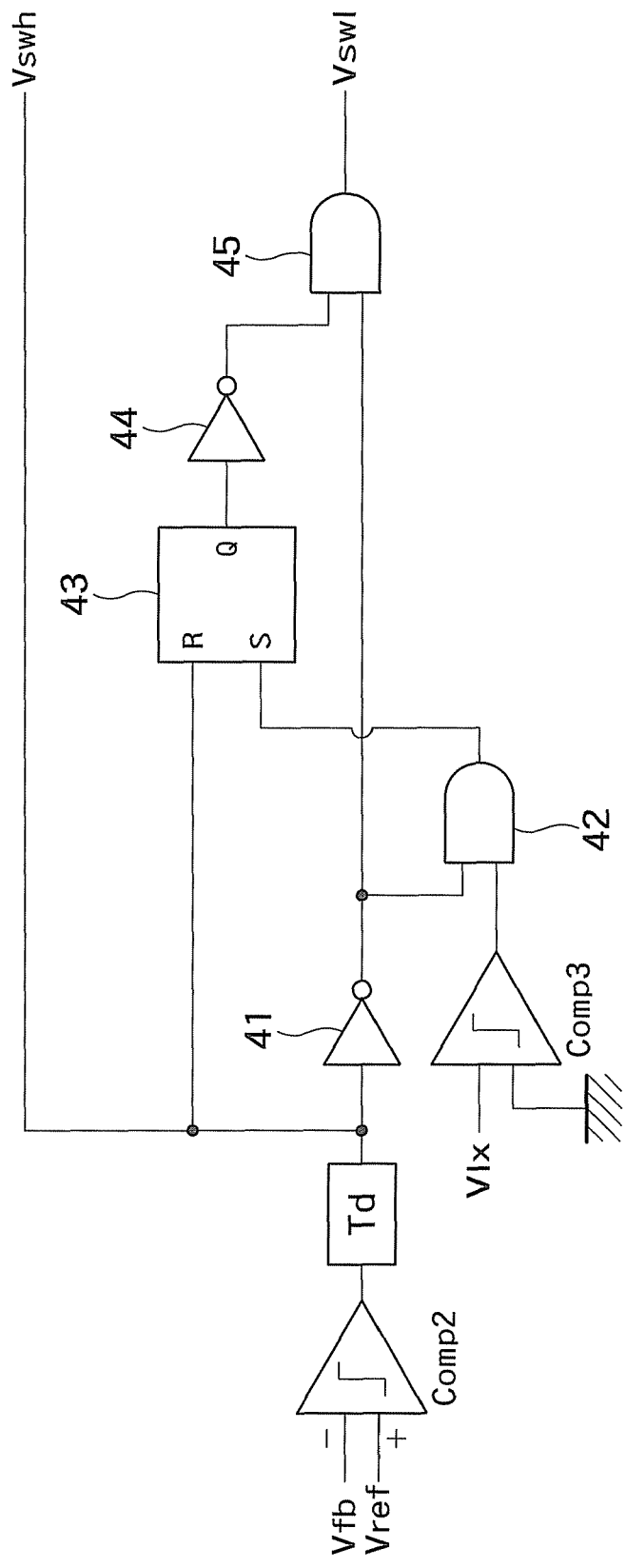
FIG. 4 is a circuit diagram in accordance with an embodiment of a switch driving circuit to improve the efficiency at the time of light load.

FIG. 4 shows another example of the switch driving circuit 11.

The comparator Comp2 and the delay element Td can be used in the same configuration shown in FIG. 3. Alternatively, the comparator Comp2 and the delay element Td may be replaced with the hysteresis comparator Comp1 as shown in FIG. 2. In the configuration shown in FIG. 4, the low-side switch SWL is forcibly turned off at the timing when the inductor current IL changes from plus to minus (the high-side switch SWH still remains in off state).

In the above examples, the low-side switch SWL is complementarily operated with the high-side switch SWH (that is, when one is in on state, the other is always off state). In this case, if the average value of the inductor current IL or a load current Iload is small, the IL becomes minus and then the charges stored in the capacitor C can flow into the ground via the low-side switch SWL when the inductor current IL decreases. Since this means that the energy stored in the capacitor is discarded to the ground, the conversion efficiency degrades.

In order to prevent the phenomenon, in the configuration shown in FIG. 4, the low-side switch SWL is forcibly turned off at the timing when the inductor current IL changes from plus to minus (the high-side switch SWH also still remains in off state). As a result, the conversion efficiency at the time of light load in which the load current is smaller than the threshold value can be improved. At the time of heavy load in which the load current is equal to or larger than the threshold value, the high-side switch and the low-side switch are complementarily turned on or off, as in the above examples.

This circuit monitors a switching node voltage Vlx (refer to FIG. 1) with a comparator Comp3 and places the low-side switch driving signal Vswl into low (turns off the low-side switch SWL) at the timing when the switching node voltage Vlx becomes zero. Hereinafter, the operation is described in detail. As a precondition, assume that the high-side switch is in off state and the low-side switch is in on state. In other words, the output of the delay element Td is a low-level signal.

The comparator Comp3 compares the switching node voltage Vlx with the ground. The switching node voltage Vlx is generated by an inductor current and on-resistance of the low-side switch SWL. When the low-side switch SWL is in on state and the inductor current IL is minus, a current flows toward the ground from the switching node Vlx via the low-side switch SWL, so that the switching node voltage Vlx is larger than the ground. As a result, the comparator Comp3 detects that the switching node voltage Vlx becomes larger than the ground, and then outputs a high-level signal as a comparison result signal. The output signal of the comparator Comp3 and the output signal of an inverter 41 are inputted to an AND circuit 42. When the low-side switch SWL is in on state, since the output of the inverter 41 is a high-level signal, the output of the AND circuit 42 also becomes a high-level signal.

The output of the AND circuit 42 is inputted to an S terminal of a flip-flop 43. An R terminal of the flip-flop 43 receives an output of the delay element Td. The R terminal receives a low-level signal, and a high-level signal is outputted from a Q terminal when the S terminal receives a high-level signal in this state. The output of the Q terminal is inverted into a low-level signal by an inverter 44, and then is inputted to one input terminal of an AND circuit 45. Although the other input terminal of the AND circuit 45 receives a high-level signal, that is equivalent to the output of the inverter 41, the output of the AND circuit 45 becomes a low-level signal by an input of the low-level signal from the inverter 44. The output of the AND circuit 45 serves as the low-side switch driving signal Vswl. Thus, the low-side switch SWL turns off. Since the output of the delay element Td is a low-level signal, the high-side switch SWH is also in off state.

By adopting the control described above, the discarding of the charges stored in the capacitor is prevented, thereby achieving the high efficiency at the time of light load.

Figure 5:
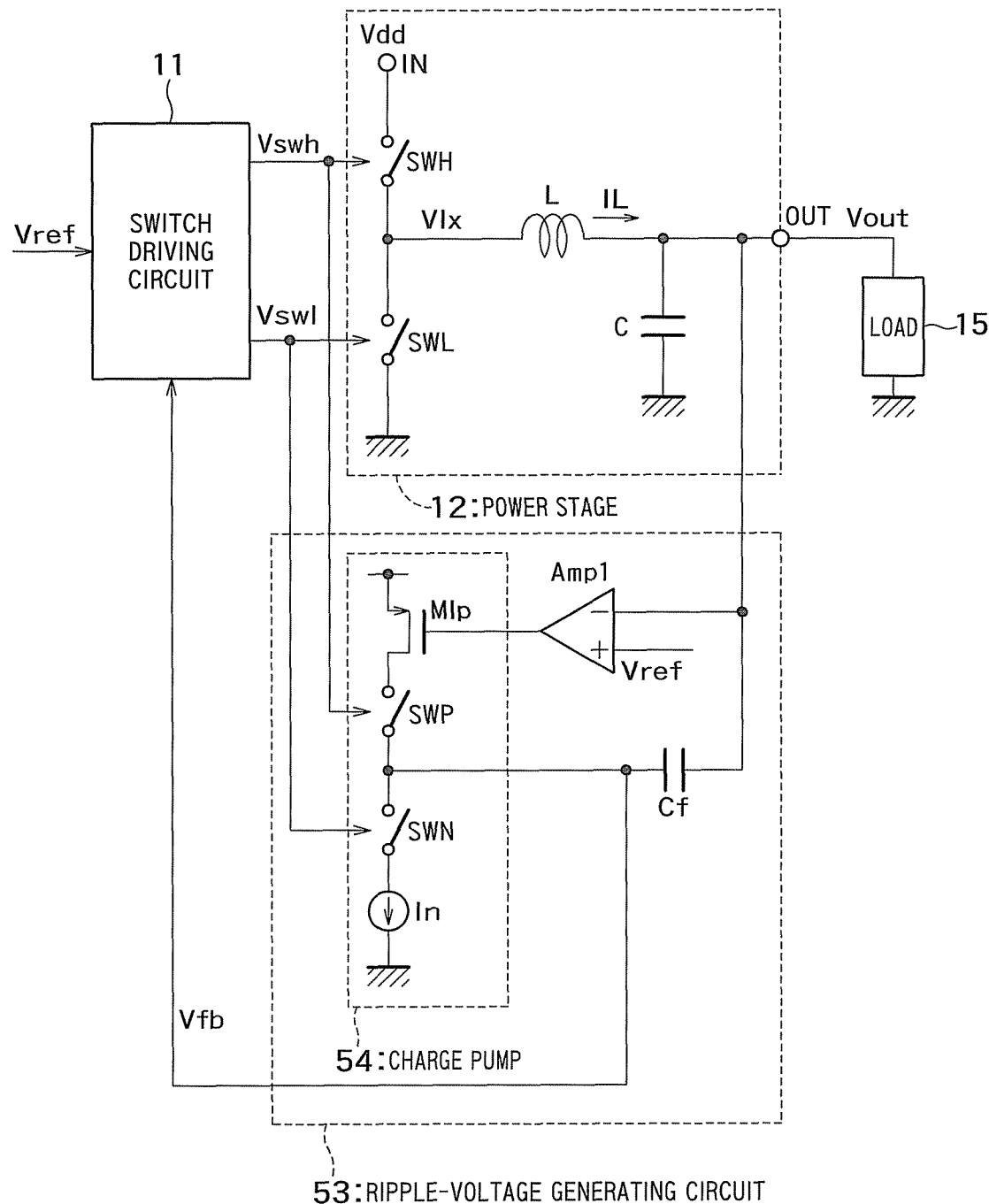
FIG. 5 is a circuit diagram showing a configuration of a ripple-control DC-DC converter in accordance with another embodiment of the present invention.

FIG. 5 shows a circuit diagram showing a configuration of a ripple-control DC-DC converter in accordance with another embodiment of the present invention.

When compared with the circuit shown in FIG. 1, the current source Ip is replaced with a PMOS transistor MIp. A gate voltage of the MIp is driven by an amplifier Amp1. An inverting input terminal of the amplifier Amp1 is connected to a voltage Vout and a non-inverting input terminal is connected to a reference voltage Vref. The amplifier Amp1 outputs an output according to a difference between the voltage Vout and the reference voltage Vref to a gate (control terminal) of the PMOS transistor MIp. When the voltage Vout reduces, the output of the amplifier Amp1 increases, thereby reducing an output current of the PMOS transistor MIp. Conversely, when the voltage Vout increases, the output of the amplifier Amp1 reduces, thereby increasing the output current of the PMOS transistor MIp.

In the embodiment, the amplifier Amp1 operates so that the current of the PMOS transistor MIp is proportional to Vdd−Vref (the voltage obtained by subtracting the reference voltage Vref from a power supply voltage Vdd). Besides, the current source In operates so as to generate a current proportional to Vref. As a result, a feedback voltage Vfb having a waveform similar to that of the inductor current IL can be generated.

In the circuit shown in FIG. 1, there is a possibility that the waveform of the feedback voltage Vfb is not similar to the waveform of the inductor current IL (for example, the feedback voltage Vfb is dispersed) if the balance between the fixed current sources Ip and In is not proper. In contrast, in this embodiment, it is made possible to generate the feedback voltage Vfb having a waveform similar to that of the inductor current IL by the operation of the amplifier Amp1 and to maintain the voltage Vout and the reference voltage Vref at the same potential, thereby improving the output voltage accuracy.

As in the embodiment described in FIG. 1, the configuration in which the high-side switch SWH is synchronized with the switch SWN and the low-side switch SWL is synchronized with the switch SWP can also be available. In this case, the current source In, not the current source Ip, may be replaced with a MOS transistor and an output of the amplifier may be inputted to a gate of the transistor. A bipolar transistor may be used instead of the MOS transistor.

Figure 6:
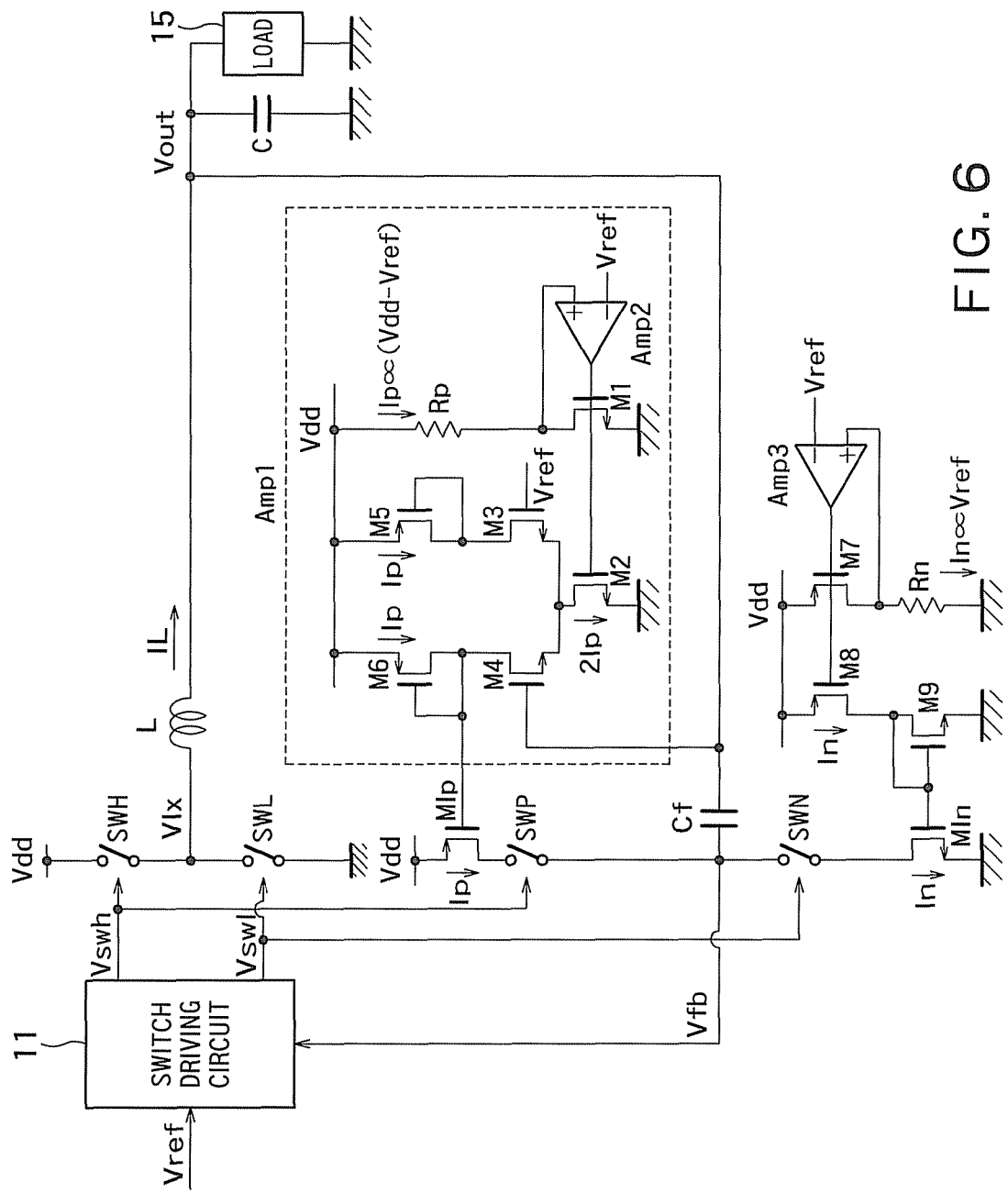
FIG. 6 is a circuit diagram of a ripple-control DC-DC converter showing a method for achieving an amplifier Amp1 and a current source In in FIG. 5.

FIG. 6 shows a detailed configuration of the ripple-control DC-DC converter shown in FIG. 5.

The amplifier Amp1 is constituted based on a differential pair of NMOS transistors composed of transistors M3 and M4. A gate of the transistor M3 is corresponding to a non-inverting input terminal and a gate of the transistor M4 is corresponding to an inverting input terminal.

A bias current of a tail current source M2 is determined by a resistor Rp, an NMOS transistor M1, and an amplifier Amp2. The potential of a first end of the resistor Rp is Vdd, and the potential of a second end of the resistor Rp is equivalent to Vref due to the virtual short-circuit of the amplifier Amp2. Thus, the voltage applied to both the ends of the resistor Rp is Vdd−Vref, and therefore a current Ip flowing through the resistor Rp is proportional to the Vdd−Vref. When this current is mirrored to the transistor M2 by the mirror ratio of 1:2, a current flowing through the M2 amounts to 2Ip.

Thus, a bias current flowing through the transistor M6 is equivalent to Ip, and this current is mirrored to a charge-pump current source (PMOS transistor) MIp by the mirror ratio of 1:1.

A current In flowing through the other charge-pump current source (NMOS transistor) MIn is determined by a transistor M7, an amplifier Amp3, and a resistor Rn. Since a voltage applied to the resistor Rn is equivalent to Vref due to the virtual short-circuit of the amplifier Amp3, the current In flowing through the resistor Rn is proportional to Vref. This current is mirrored to a transistor M8, and the mirrored current is further mirrored to the charge-pump current source (NMOS transistor) MIn.

Here, temporal differentiation of the inductor current IL during the time when the high-side switch SWH is in on state, the following formula is given:

$$\frac{dIL}{dt}\bigg|_{Vlx=Vdd} = \frac{1}{L}(Vdd - Vout) \approx \frac{1}{L}(Vdd - Vref)$$

From the formula, it can be seen that the result is proportional to Vdd−Vref.

Similarly, temporal differentiation of the inductor current IL during the time when the low-side switch SWL is in on state, the following formula is given:

$$\frac{dIL}{dt}\bigg|_{Vlx=0} = -\frac{1}{L}Vout \approx -\frac{1}{L}Vref$$

From the formula, it can be seen that the result is proportional to the reference voltage Vref.

Accordingly, as described above, the waveform of the feedback voltage Vfb can be made similar to the waveform of the inductor current IL by proportionating the current Ip of the charge-pump current source (PMOS transistor) MIp to Vdd−Vref and by proportionating the current In of the charge pump current source (NMOS transistor) MIn to the reference voltage Vref.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A DC-DC converter converting an input voltage into an output voltage different from the input voltage, comprising:
   an input terminal which receives the input voltage;
   an output terminal which outputs the output voltage;
   a power stage comprising a high-side switch, a low-side switch and an inductor, wherein a first end of the high-side switch is connected to the input terminal, a first end of the low-side switch is connected to a ground and a second end of the low-side switch is connected to a second end of the high-side switch, and wherein a first end of the inductor is connected to the second end of the high-side switch and a second end of the inductor is connected to the output terminal;
   a switch driving circuit which generates a high-side switch driving signal and a low-side switch driving signal that drive the high-side switch and the low-side switch;
   a charge pump which generates a current of a first polarity according to the high-side switch driving signal and which generates a current of a second polarity having an opposite polarity to the first polarity according to the low-side switch driving signal; and
   a capacitor which generates a first voltage by integrating the current of the first polarity and the current of the second polarity generated by the charge pump,
   wherein the switch driving circuit generates the high-side switch driving signal and the low-side switch driving signal according to a difference between the first voltage and a reference voltage.

2. The DC-DC converter according to claim 1, wherein the charge pump includes a first current source, a first switch having a first end connected to the first current source, a second current source, and a second switch having a first end connected to the second current source and a second end connected to a second end of the first switch;
   wherein the first switch is driven according to the high-side switch driving signal, and the second switch is driven according to the low-side switch driving signal;
   wherein a first end of the capacitor is electrically connected to the second end of the first switch and the second end of the second switch, and a second end of the capacitor is electrically connected to the output terminal; and
   wherein the first voltage is a voltage at the first end of the capacitor.

3. The DC-DC converter according to claim 1, further comprising an amplifier which generates a signal according to a difference between the output voltage and the reference voltage,
   wherein the charge pump generates the current of the first polarity using the signal generated by the amplifier.

4. The DC-DC converter according to claim 3, wherein the charge pump includes a transistor having a first end connected to a fixed voltage, a first switch having a first end connected to a second end of the transistor, a current source, and a second switch having a first end connected to the current source and a second end connected to a second end of the first switch,
   wherein the first switch is driven according to the high-side switch driving signal, and the second switch is driven according to the low-side switch driving signal,
   wherein the signal generated by the amplifier is applied to a control terminal of the transistor; and
   wherein a first end of the capacitor is electrically connected to the second end of the first switch and the second end of the second switch, a second end of the capacitor is electrically connected to the output terminal, and the first voltage is a voltage at the first end of the capacitor.

5. The DC-DC converter according to claim 1, wherein the switch driving circuit includes a hysteresis comparator which compares the first voltage with the reference voltage to generate a comparison result signal, and generates the high-side switch driving signal and the low-side switch driving signal according to the comparison result signal.

6. The DC-DC converter according to claim 1, wherein the switch driving circuit includes:
   a comparator which compares the first voltage with the reference voltage to generate a comparison result signal; and
   a delay element which delays the comparison result signal, and wherein the switch driving circuit generates the high-side switch driving signal and the low-side switch driving signal according to the comparison result signal delayed by the delay element.

7. The DC-DC converter according to claim 1, wherein the switch driving circuit includes a comparator which compares a voltage at the second end of the low-side switch with the ground to generate a comparison result signal, and generates the low-side switch driving signal according to the comparison result signal.

8. The DC-DC converter according to claim 1, wherein the switch driving circuit generates the high-side switch driving signal and the low-side switch driving signal so that the high-side switch and the low-side switch operate complementarily.

9. The DC-DC converter according to claim 1, where the reference voltage is a target voltage for the output voltage.

* * * * *